(12) United States Patent
Thomas et al.

(10) Patent No.: US 8,474,343 B2
(45) Date of Patent: Jul. 2, 2013

(54) TRANSMISSION HAVING A LOW LAUNCH GEAR

(75) Inventors: Steven G. Thomas, Bloomfield Hills, MI (US); Steven A. Frait, Milan, MI (US); Jeffrey E. Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 12/876,414

(22) Filed: Sep. 7, 2010

(65) Prior Publication Data

US 2011/0314939 A1    Dec. 29, 2011

Related U.S. Application Data

(63) Continuation-in-part of application No. 12/824,347, filed on Jun. 28, 2010.

(51) Int. Cl.
*F16H 3/08* (2006.01)
(52) U.S. Cl.
USPC ............................................................ 74/331
(58) Field of Classification Search
USPC .................. 74/325, 329–331, 339, 340, 640, 74/606 R; 475/211
See application file for complete search history.

(56) References Cited

U.S. PATENT DOCUMENTS

| | | | |
|---|---|---|---|
| 4,584,891 A | 4/1986 | Mori | |
| 5,044,215 A | 9/1991 | Watanabe | |
| 5,390,560 A | 2/1995 | Ordo | |
| 5,564,997 A * | 10/1996 | Janson et al. | 475/207 |
| 6,655,226 B2 * | 12/2003 | Oguri | 74/333 |
| 6,886,424 B2 * | 5/2005 | Janson et al. | 74/329 |
| 6,990,871 B2 * | 1/2006 | Ebenhoch | 74/74 |
| 7,171,867 B2 | 2/2007 | McCrary et al. | |
| 8,205,516 B2 * | 6/2012 | Kobayashi et al. | 74/331 |
| 2007/0149344 A1 | 6/2007 | McGrath et al. | |
| 2008/0202266 A1 * | 8/2008 | Hendrickson et al. | 74/331 |
| 2008/0202267 A1 * | 8/2008 | Hendrickson et al. | 74/331 |
| 2011/0314939 A1 * | 12/2011 | Thomas et al. | 74/331 |

* cited by examiner

*Primary Examiner* — Troy Chambers
*Assistant Examiner* — Alexander Vu
(74) *Attorney, Agent, or Firm* — James Dottavio; MacMillian Sobanski & Todd, LLC

(57) ABSTRACT

A vehicle transmission includes a pinion secured to an input shaft, a gear meshing with the pinion, an idler secured to the gear, a reverse gear meshing with the idler and secured to a second idler, a low gear supported on a layshaft and meshing with the second idler, and a coupler connecting the low gear to the layshaft.

11 Claims, 6 Drawing Sheets

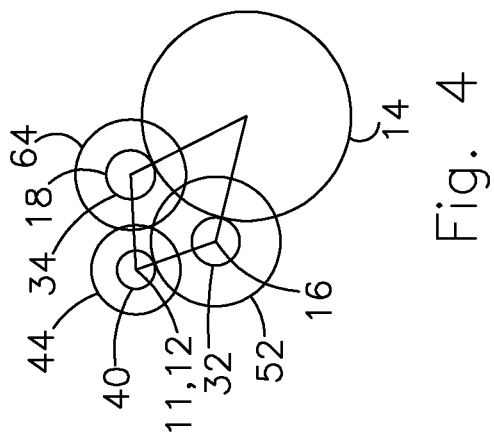
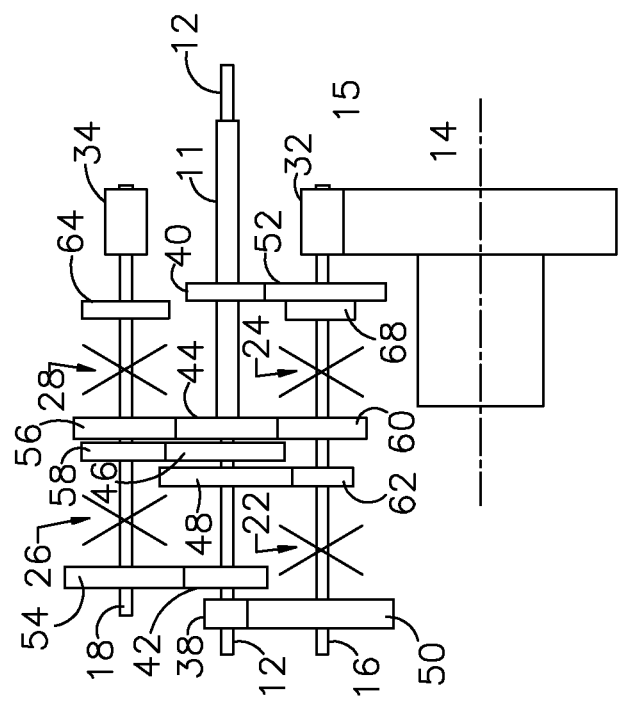

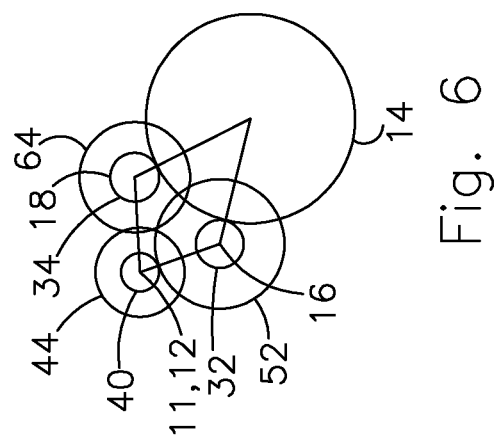
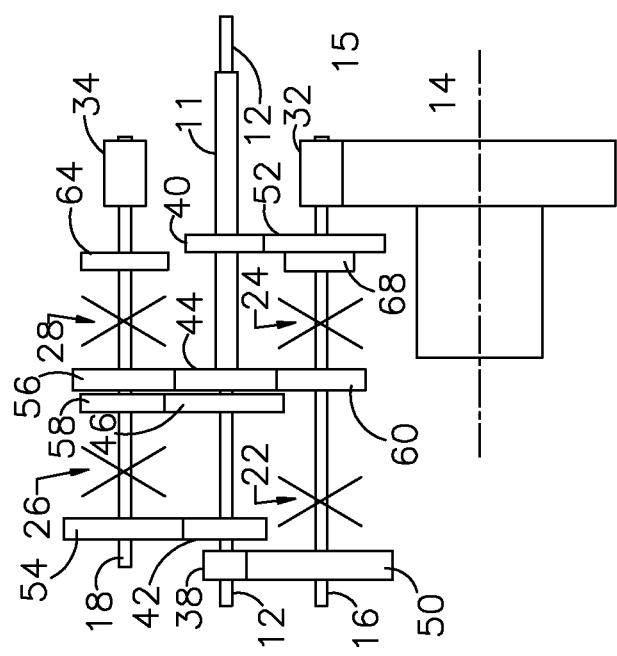

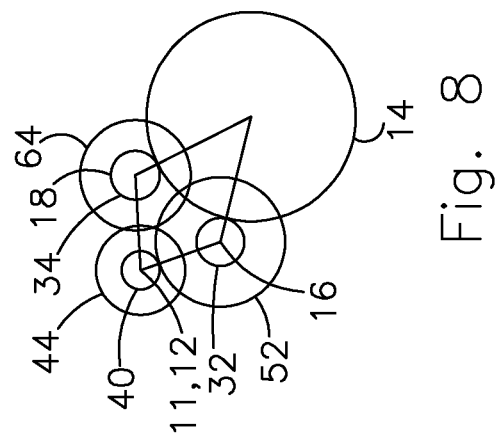
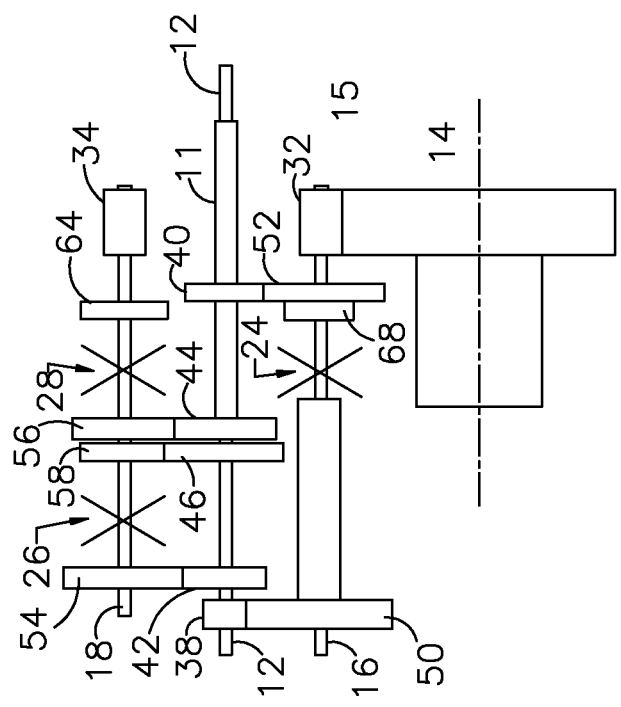

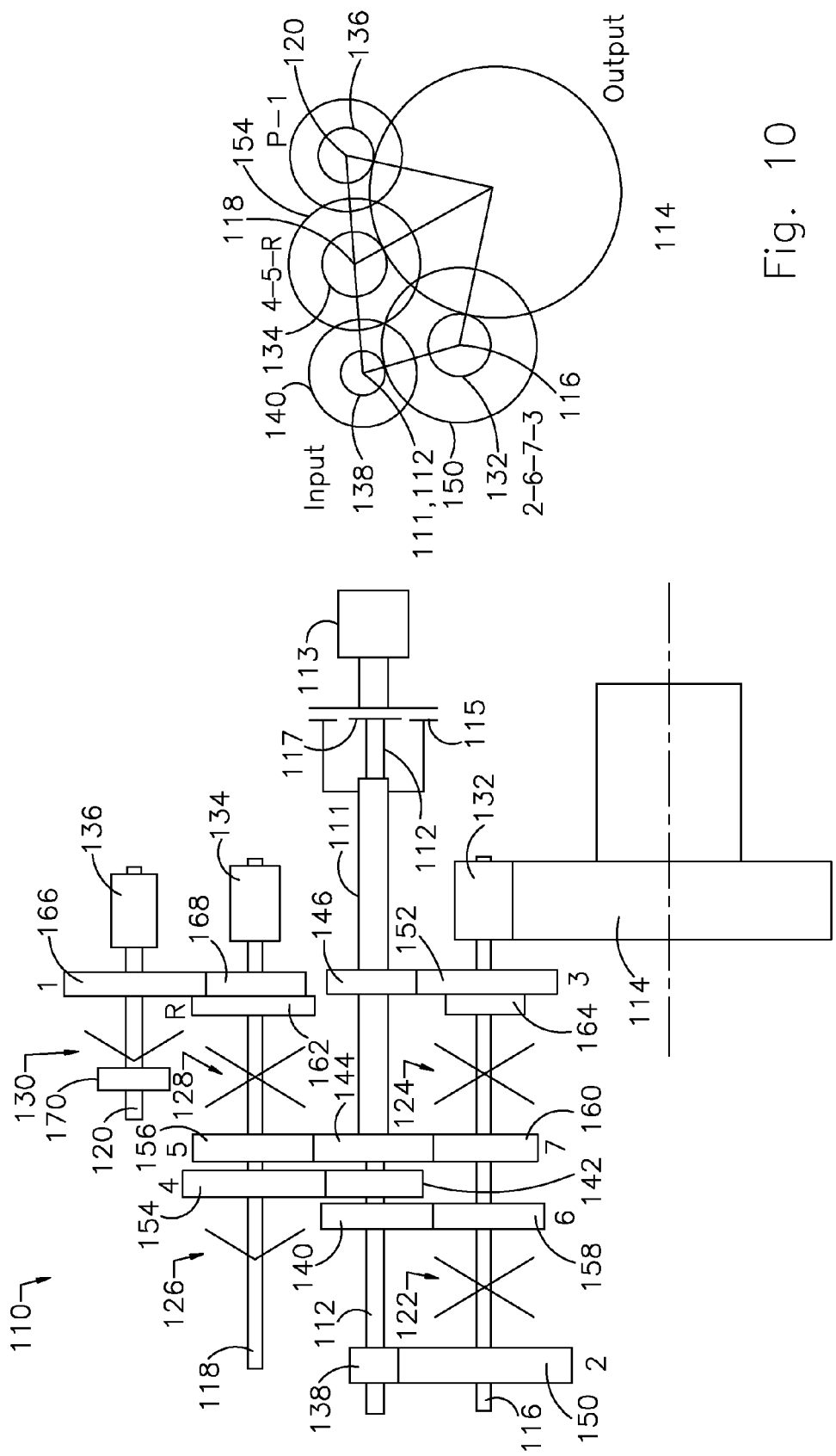

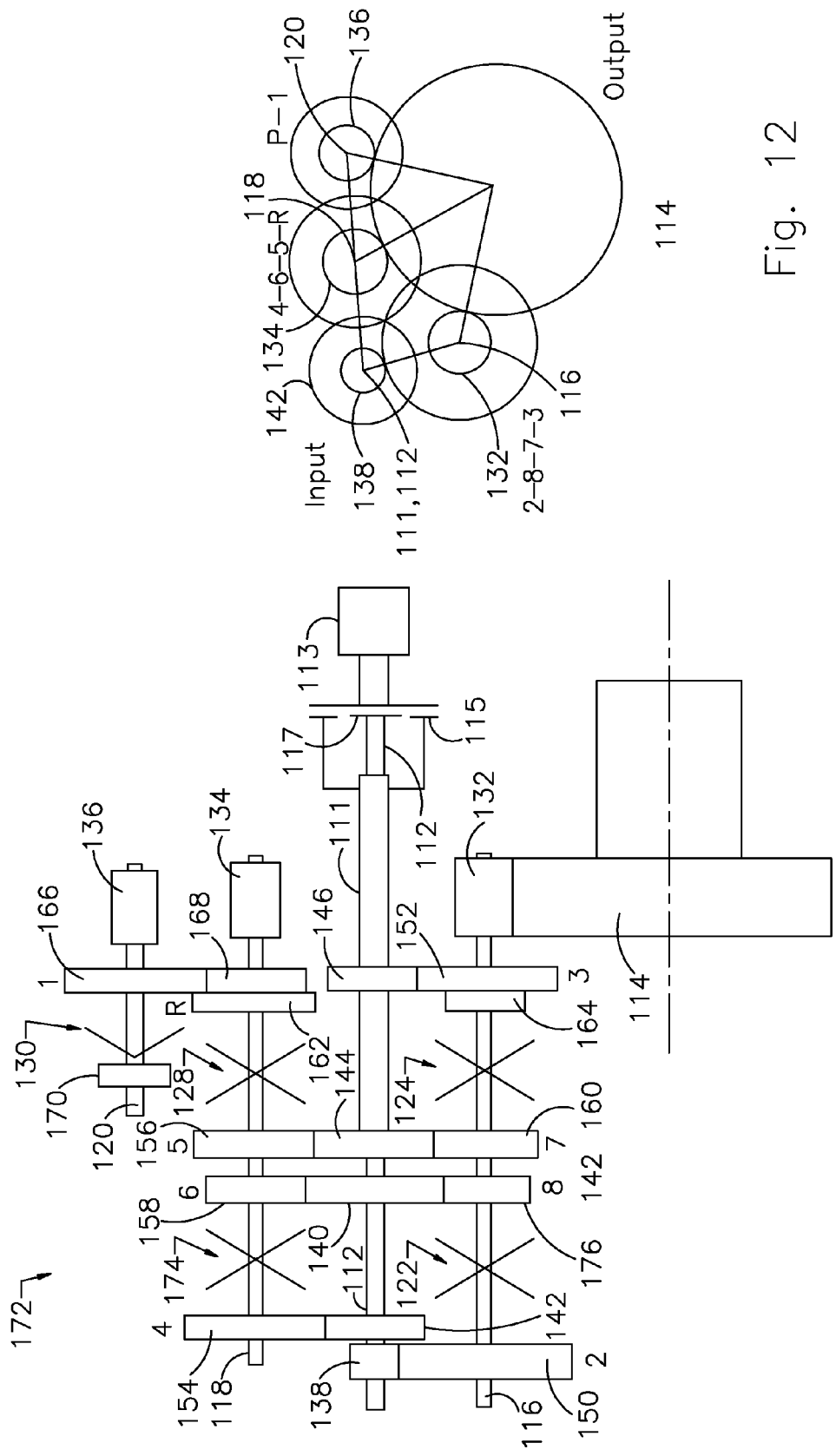

US 8,474,343 B2

TRANSMISSION HAVING A LOW LAUNCH GEAR

This application is a continuation-in-part of pending U.S. application Ser. No. 12/824,347, filed Jun. 28, 2010.

BACKGROUND OF THE INVENTION

1. Field of the Invention

This invention relates generally to a powertrain for a motor vehicle, and, in particular, to the kinematic arrangement for a powershift transmission.

2. Description of the Prior Art

A dual clutch transmission (DCT), also called a powershift transmission, is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with certain gears; the other input clutch transmits torque between the transmission input and a second layshaft associated with the other gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

A powershift transmission launches the vehicle from a stopped or nearly stopped condition using a start clutch. Due to engine downsizing and boosting for a given vehicle size, boost is not present at launch causing potentially insufficient transmission gear ratio for launching.

A powershift transmission generally has a specific number of gears and provides little design flexibility for accommodating an increase in the number of gears to five, six or seven speeds.

A powershift transmission also has complex electro-hydraulic controls to accommodate required synchronizer states. Some designs have relied on multiplexing clutch controls with synchronizer control in an attempt to deduce cost, which results in reduced operating performance, such longer shift times, loss of repeatable high quality shifts, and an increased number of failure states.

SUMMARY OF THE INVENTION

A vehicle transmission includes a pinion secured to an input shaft, a gear meshing with the pinion, an idler secured to the gear, a reverse gear meshing with the idler and secured to a second idler, a low gear supported on a layshaft and meshing with the second idler, and a coupler connecting the low gear to the layshaft.

The gearbox incorporates a low launch gear able to produce a speed ratio greater than 24:1, as compare to a conventional powershift transmission whose lowest gear has a speed ratio of less than 20:1, more typically 16:1 or 18:1

The gearbox preferably produces seven forward speeds and reverse drive in addition to the low launch gear, but it can be converted easily to produce five, six or seven forward speeds and reverse drive with or without the low launch gear.

When the low launch gear is incorporated, the speed ratio of the first gear can be numerically lower than usual, allowing smaller speed ratio steps between adjacent gears or using the span to achieve a larger number of overdrive producing gears.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a schematic diagram of transmission gearing that produces seven forward speeds and reverse drive;

FIG. 4 is a schematic diagram showing an end view of the gearing of FIG. 3;

FIG. 5 is a schematic diagram of transmission gearing that produces six forward speeds and reverse drive;

FIG. 6 is a schematic diagram showing an end view of the gearing of FIG. 5.

FIG. 7 is a schematic diagram of transmission gearing that produces five forward speeds and reverse drive;

FIG. 8 is a schematic diagram showing an end view of the gearing of FIG. 7;

FIG. 9 is a schematic diagram of a transmission kinematic arrangement that produces reverse drive and seven forward speeds including a low launch gear;

FIG. 10 is a schematic diagram showing an end view of the gearing of FIG. 9.

FIG. 11 is a schematic diagram of a transmission kinematic arrangement that produces reverse drive and eight forward speeds including a low launch gear; and FIG. 12 is a schematic diagram showing an end view of the gearing of FIG. 11.

DESCRIPTION OF THE PREFERRED EMBODIMENT

Figure 1:
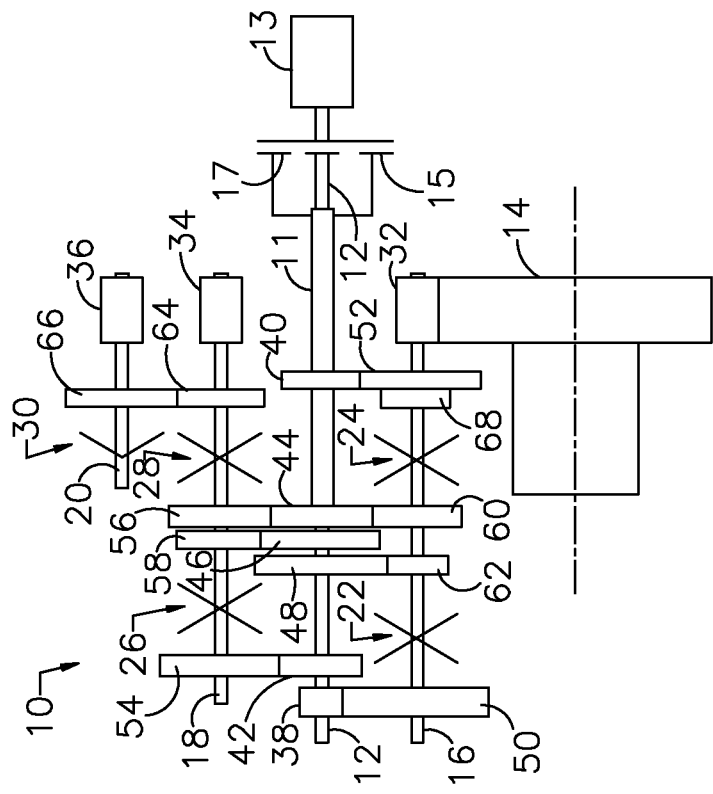
FIG. 1 is a schematic diagram of transmission gearing that produces reverse drive and eight forward speeds including a low launch gear.

Referring now to FIG. 1, a powershift transmission 10 includes first and second coaxial input shafts 11, 12, an output gear 14 driveably connected to the vehicle wheels (not shown); first, second and third layshafts 16, 18, 20, respectively; a 1-7 synchronizer 22; a 6-2 synchronizer 24; a 3-5 synchronizer 26; a 4-R synchronizer 28; and a L synchronizer 30. Outer shaft 11 is driveably connected to an engine 13 through an input clutch 15. Inner shaft 12 is driveably connected to the engine through an input clutch 17.

Each layshaft 16, 18, 20 includes an output pinion 32, 34, 36, secured to the respective layshaft. Each synchronizer is secured to the layshaft on which it is supported and includes a selector sleeve having a neutral position from which it is moved axially along the shaft to secure a gear to the shaft. Input clutches 15, 17 include sets of clutch plates, which alternately engage and disengage mutually.

Secured to input shaft 12 are input pinions 38, 42, 46, 48. Secured to input shaft 11 are input pinions 40, 44. First gear 50 meshes with pinion 38 and is journalled on layshaft 16. Second gear 52 meshes with pinion 40 and is journalled on layshaft 16. Third gear 54 meshes with pinion 42 and is journalled on layshaft 18. Fourth gear 56 meshes with pinion 44 and is journalled on layshaft 18. Fifth gear 58 meshes with pinion 46 and is journalled on layshaft 18. Sixth gear 60 meshes with pinion 44 and is journalled on layshaft 16. Seventh gear 62 meshes with pinion 48 and is journalled on layshaft 16. Reverse gear 64 meshes with idler gear 68 and low gear 66 and is journalled on layshaft 18. Low gear 66 is journalled on layshaft 20. An idler gear 68, secured to second gear 52, is also journalled on layshaft 16 for rotation with gear 52 as a unit.

In operation, each of the gear ratios is produced by transmitting power from the engine 13, through one of the input clutch 15, 17, to the input shaft 11, 12 that corresponds to the desired gear. First gear results when the sector sleeve of synchronizer 22 is moved leftward into engagement with first gear 50 and the selector sleeves of the other synchronizers are in their neutral positions, thereby connecting input shaft 12 to output gear 14 through the mesh between pinion 38 and gear 50, and the mesh between output pinion 32 and output gear 14.

Second gear results when the selector sleeve of synchronizer 24 is moved rightward into engagement with idler 68 and the selector sleeves of the other synchronizers are in their neutral positions, thereby connecting input shaft 11 to output gear 14 through the mesh between pinion 40 and gear 52, and the mesh between output pinion 32 and output gear 14.

Third gear results when the selector sleeve of synchronizer 26 is moved leftward into engagement with third gear 54 and the selector sleeves of the other synchronizers are in their neutral positions, thereby connecting input shaft 12 to output gear 14 through the mesh between pinion 42 and gear 54, and the mesh between output pinion 34 and output gear 14.

Fourth gear results when the selector sleeve of synchronizer 28 is moved leftward into engagement with fourth gear 56 and the selector sleeves of the other synchronizers are in their neutral positions, thereby connecting input shaft 11 to output gear 14 through the mesh between pinion 44 and gear 56, and the mesh between output pinion 34 and output gear 14.

Fifth gear results when the selector sleeve of synchronizer 26 is moved rightward into engagement with fifth gear 58 and the selector sleeves of the other synchronizers are in their neutral positions, thereby connecting input shaft 12 to output gear 14 through the mesh between pinion 46 and gear 58, and the mesh between output pinion 34 and output gear 14.

Sixth gear results when the selector sleeve of synchronizer 24 is moved leftward into engagement with sixth gear 60 and the selector sleeves of the other synchronizers are in their neutral positions, thereby connecting input shaft 11 to output gear 14 through the mesh between pinion 44 and gear 60, and the mesh between output pinion 32 and output gear 14.

Seventh gear results when the selector sleeve of synchronizer 22 is moved rightward into engagement with seventh gear 62 and the selector sleeves of the other synchronizers are in their neutral positions, thereby connecting input shaft 12 to output gear 14 through the mesh between pinion 48 and gear 62, and the mesh between output pinion 32 and output gear 14.

Reverse gear results when the selector sleeve of synchronizer 28 is moved rightward into engagement with reverse gear 64, and the selector sleeves of the other synchronizers are in their neutral positions. The reverse gear power path through transmission 10 includes input shaft 11, pinion 40, second gear 52, idler 68, reverse gear 64, synchronizer 28, layshaft 18, output pinion 34 and output gear 14.

The ultra low or deep low launch gear results when the selector sleeve of synchronizer 30 is moved rightward into engagement with low launch gear 66, and the selector sleeves of the other synchronizers are in their neutral positions. The low gear power path through transmission 10 includes input shaft 11, pinion 40, second gear 52, idler 68, reverse gear 64, low gear 66, synchronizer 30, layshaft 20, output pinion 36 and output gear 14.

The final drive ratio, i.e., the mesh between pinions 32, 34, 36 and gear 14, has a speed ratio of about 4.5. The speed ratio produced in first gear by the mesh between pinion 38 and first gear 50 is about 4.5. Therefore, the first gear speed ratio produced by transmission 10 is about 20:1 (4.5×4.5). In low gear, however, transmission 10 produces a speed ratio, which is the result of a forward gear ratio (2nd gear), a reverse ratio, a low gear ratio and the final drive ratio (4.5). Therefore, a speed ratio of 20:1 is no longer a limit; instead speed ratios much greater than 20:1, e.g. speed ratios greater than 24:1, can be easily produced by transmission 10.

The gearbox preferably produces seven forward speeds and reverse drive in addition to the ultra low gear, but it can be converted easily to produce five, six or seven forward speeds and reverse drive with or without the low launch gear.

Figure 2:
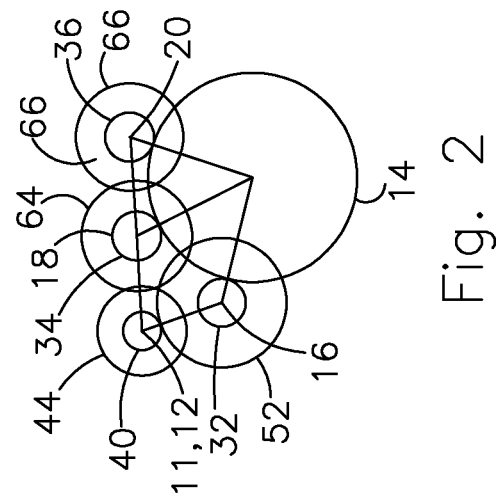
FIG. 2 is a schematic diagram showing an end view of the gearing of FIG. 1.

FIGS. 3 and 4 are schematic diagrams, with the input clutches 15, 17 removed, showing transmission gearing that produces seven forward speeds and reverse drive, by simply deleting from the gearing of FIG. 1 low gear 66, layshaft 20, synchronizer 30, and the output pinion 36. The transmission of FIGS. 3 and 4 operates substantially the same as described with reference to the gearing of FIGS. 1 and 2, except for the low launch gear.

FIGS. 5 and 6 are schematic diagrams, with the input clutches 15, 17 removed, showing transmission gearing that produces six forward speeds and reverse drive, by deleting from the gearing of FIG. 3, seventh gear 62 and pinion 48 and the portion of synchronizer 22 that engaged seventh gear 62. The transmission of FIGS. 5 and 6 operates substantially the same as described with reference to the gearing of FIGS. 1 and 2, except for seventh gear and the low launch gear.

FIGS. 7 and 8 are schematic diagrams, with the input clutches 15, 17 removed, showing transmission gearing that produces five forward speeds and reverse drive, by deleting from the gearing of FIG. 5 sixth gear 60, and synchronizer 22. The transmission of FIGS. 7 and 8 operates substantially the same as described with reference to the gearing of FIGS. 1 and 2, except for sixth gear, seventh gear and low launch gear.

The low launch gear can be incorporated in the gearing of FIGS. 5 and 7 by incorporating low gear 66 meshing with reverse gear 64, layshaft 20 supporting low gear 66, synchronizer 30 for coupling low gear 66 to layshaft 20, and the output pinion 36 meshing with the output 14.

Although the transmission has been described with reference to synchronizers 22, 24, 26, 28, 30, the synchronizers can be replaced by clutch couplers for connecting a layshaft to a gear selected for engagement to the respective layshaft.

Referring now to FIGS. 9 and 10 a powershift transmission 110 includes first and second coaxial input shafts 111, 112, an output gear 114 driveably connected to the vehicle's road wheels (not shown); first, second and third layshafts 116, 118, 120, respectively; a 2-6 synchronizer 122; a 7-3 synchronizer 124; a 4 synchronizer 126; a 5-R synchronizer 128; and a L synchronizer 130. Input shafts 111, 112 are coaxial. The outer input shaft 111 is driveably connected to an engine 113 through an input clutch 115. The inner input shaft 12 is driveably connected to the engine through an input clutch 117.

Each layshaft 116, 118, 120 includes an output pinion 132, 134, 136, secured to the respective layshaft and meshing with output gear 114. Power is transmitted between each layshaft 116, 118, 120 and output gear 114 through a final drive corresponding to each layshaft. The final drive for layshaft 116 includes pinion 132 and output gear 114. The final drive for layshaft 118 includes pinion 134 and output gear 114. The final drive for layshaft 120 includes pinion 136 and output gear 114.

Each synchronizer 122, 124, 126, 128, 130 is secured to the layshaft on which it is supported and includes a selector sleeve having a neutral position from which it is moved axially along the shaft to secure a gear to the layshaft. Input clutches 115, 117 include sets of clutch plates, which alternately engage and disengage mutually.

Secured to input shaft 112 are input pinions 138, 140, 142. Secured to input shaft 111 are input pinions 144, 146. Second gear 150 meshes with pinion 138 and is journalled on layshaft 116. Third gear 152 meshes with pinion 146 and is journalled on layshaft 116. Fourth gear 154 meshes with pinion 142 and is journalled on layshaft 118. Fifth gear 156 meshes with pinion 144 and is journalled on layshaft 118. Sixth gear 158 meshes with pinion 140 and is journalled on layshaft 116. Seventh gear 160 meshes with pinion 144 and is journalled on layshaft 116. Reverse gear 162 meshes with an idler gear 164 and is journalled on layshaft 118. First gear 166 meshes with an idler gear 168 and is journalled on layshaft 120. Idler gear 164, which is secured to third gear 152, is also journalled on layshaft 116 for rotation with gear 152 as a unit. Idler gear 168, which is secured to reverse gear 162, is also journalled on layshaft 118 for rotation with gear 162 as a unit.

Park gear 170, which is secured to layshaft 120, is alternately engaged and disengaged by a park pawl (not shown) secured to a fixed member such as the transmission case. When the park gear is engaged by a park pawl, the vehicle is secured from rolling by connection to the road wheels from output pinion 136 to output gear 114.

In operation, each of seven forward speeds and reverse drive are produced by transmitting power from the engine 113, through one of the input clutch 115, 117 to the input shaft 111, 112 that corresponds to the desired gear.

First gear, which is an ultra low or deep low launch gear, is produced when clutch 115 is engaged, clutch 117 is disengaged, the sector sleeve of synchronizer 130 is moved rightward into engagement with first gear 166, thereby connecting gear 166 to layshaft 120, and the selector sleeves of the other synchronizers are in their neutral positions. The low gear power path through transmission 110 includes input shaft 111, pinion 146, third gear 152, idler 164, reverse gear 162, idler 168, low gear 166, synchronizer 130, layshaft 120, output pinion 136 and output gear 114.

Second gear is produced when clutch 117 is engaged, clutch 115 is disengaged, the selector sleeve of synchronizer 122 is moved leftward into engagement with second gear 150, thereby connecting second gear 150 to layshaft 116, and the selector sleeves of the other synchronizers are in their neutral positions. The second gear power path includes input shaft 112, pinion 138, second gear 150, synchronizer 122, layshaft 116, output pinion 132 and output gear 114.

Third gear is produced when clutch 115 is engaged, clutch 117 is disengaged, the selector sleeve of synchronizer 124 is moved rightward into engagement with idler 164, thereby connecting idler 164 and third gear 152 to layshaft 116, and the selector sleeves of the other synchronizers are in their neutral positions. The third gear power path includes input shaft 111, pinion 146, third gear 152, synchronizer 124, layshaft 116, output pinion 132 and output gear 114.

Fourth gear is produced when clutch 117 is engaged, clutch 115 is disengaged, the selector sleeve of synchronizer 126 is moved rightward into engagement with fourth gear 154, thereby connecting fourth gear 154 to layshaft 118, and the selector sleeves of the other synchronizers are in their neutral positions. The fourth gear power path includes input shaft 112, pinion 142, fourth gear 154, synchronizer 126, layshaft 118, output pinion 134 and output gear 114.

Fifth gear is produced when clutch 115 is engaged, clutch 117 is disengaged, the selector sleeve of synchronizer 128 is moved leftward into engagement with fifth gear 156, thereby connecting fifth gear 156 to layshaft 118, and the selector sleeves of the other synchronizers are in their neutral positions. The fifth gear power path includes input shaft 111, pinion 144, fifth gear 156, synchronizer 128, layshaft 118, output pinion 134 and output gear 114.

Sixth gear is produced when clutch 117 is engaged, clutch 115 is disengaged, the selector sleeve of synchronizer 122 is moved rightward into engagement with sixth gear 158, thereby connecting sixth gear 158 to layshaft 116, and the selector sleeves of the other synchronizers are in their neutral positions. The sixth gear power path includes input shaft 112, pinion 140, sixth gear 158, synchronizer 122, layshaft 116, output pinion 132 and output gear 114.

Seventh gear is produced when clutch 115 is engaged, clutch 117 is disengaged, the selector sleeve of synchronizer 124 is moved leftward into engagement with seventh gear 160, thereby connecting seventh gear 160 to layshaft 116, and the selector sleeves of the other synchronizers are in their neutral positions. The seventh gear power path includes input shaft 111, pinion 144, seventh gear 160, synchronizer 124, layshaft 116, output pinion 132 and output gear 114.

Reverse gear is produced when clutch 115 is engaged, clutch 117 is disengaged, the selector sleeve of synchronizer 128 is moved rightward into engagement with reverse gear 162, thereby connecting reverse gear 162 and idler 168 to layshaft 118, and the selector sleeves of the other synchronizers are in their neutral positions. The reverse gear power path includes input shaft 111, pinion 146, third gear 152, idler 164, reverse gear 162, synchronizer 128, layshaft 118, output pinion 134 and output gear 114.

Referring now to FIGS. 11 and 12 the powershift transmission 172 includes first and second coaxial input shafts 111, 112, an output gear 114 driveably connected to the vehicle's wheels (not shown); first, second and third layshafts 116, 118, 120, respectively; a 2-8 synchronizer 122; a 7-3 synchronizer 124; a 4-6 synchronizer 174; a 5-R synchronizer 128; and a L synchronizer 130. Input shafts 111, 112 are coaxial. The outer input shaft 111 is driveably connected to an engine 113 through an input clutch 115. The inner input shaft 12 is driveably connected to the engine through an input clutch 117.

Each layshaft 116, 118, 120 includes an output pinion 132, 134, 136, secured to the respective layshaft and meshing with output gear 114. Power is transmitted between each layshaft 116, 118, 120 and output gear 114 through a final drive corresponding to each layshaft. The final drive for layshaft 116 includes pinion 132 and output gear 114. The final drive for layshaft 118 includes pinion 134 and output gear 114. The final drive for layshaft 120 includes pinion 136 and output gear 114.

Each synchronizer 122, 124, 174, 128, 130 is secured to the layshaft on which it is supported and includes a selector sleeve having a neutral position from which it is moved axially along the shaft to secure a gear to the layshaft. Input clutches 115, 117 include sets of clutch plates, which alternately engage and disengage mutually.

Secured to input shaft 112 are input pinions 138, 140, 142. Secured to input shaft 111 are input pinions 144, 146. Second gear 150 meshes with pinion 138 and is journalled on layshaft 116. Third gear 152 meshes with pinion 146 and is journalled on layshaft 116. Fourth gear 154 meshes with pinion 142 and is journalled on layshaft 118. Fifth gear 156 meshes with pinion 144 and is journalled on layshaft 118. Sixth gear 158 meshes with pinion 140 and is journalled on layshaft 118. Seventh gear 160 meshes with pinion 144 and is journalled on layshaft 116. Reverse gear 162 meshes with an idler gear 164 and is journalled on layshaft 118. First gear 166 meshes with an idler gear 168 and is journalled on layshaft 120. Idler gear 164, which is secured to third gear 152, is also journalled on layshaft 116 for rotation with gear 152 as a unit. Idler gear 168, which is secured to reverse gear 162, is also journalled on layshaft 118 for rotation with gear 162 as a unit.

In operation, each of eight forward speeds and reverse drive are produced by transmitting power from the engine 113, through one of the input clutch 115, 117, to the input shaft 111, 112 that corresponds to the desired gear.

First gear, which is an ultra low or deep low launch gear, is produced when clutch 115 is engaged, clutch 117 is disengaged, the sector sleeve of synchronizer 130 is moved rightward into engagement with first gear 166, thereby connecting gear 166 to layshaft 120, and the selector sleeves of the other synchronizers are in their neutral positions. The low gear power path through transmission 110 includes input shaft 111, pinion 146, third gear 152, idler 164, reverse gear 162, idler 168, low gear 166, synchronizer 130, layshaft 120, output pinion 136 and output gear 114.

Second gear is produced when clutch 117 is engaged, clutch 115 is disengaged, the selector sleeve of synchronizer 122 is moved leftward into engagement with second gear 150, thereby connecting second gear 150 to layshaft 116, and the selector sleeves of the other synchronizers are in their neutral positions. The second gear power path includes input shaft 112, pinion 138, second gear 150, synchronizer 122, layshaft 116, output pinion 132 and output gear 114.

Third gear is produced when clutch 115 is engaged, clutch 117 is disengaged, the selector sleeve of synchronizer 124 is moved rightward into engagement with idler 164, thereby connecting idler 164 and third gear 152 to layshaft 116, and the selector sleeves of the other synchronizers are in their neutral positions. The third gear power path includes input shaft 111, pinion 146, third gear 152, synchronizer 124, layshaft 116, output pinion 132 and output gear 114.

Fourth gear is produced when clutch 117 is engaged, clutch 115 is disengaged, the selector sleeve of synchronizer 174 is moved leftward into engagement with fourth gear 154, thereby connecting fourth gear 154 to layshaft 118, and the selector sleeves of the other synchronizers are in their neutral positions. The fourth gear power path includes input shaft 112, pinion 142, fourth gear 154, synchronizer 174, layshaft 118, output pinion 134 and output gear 114.

Fifth gear is produced when clutch 115 is engaged, clutch 117 is disengaged, the selector sleeve of synchronizer 128 is moved leftward into engagement with fifth gear 156, thereby connecting fifth gear 156 to layshaft 118, and the selector sleeves of the other synchronizers are in their neutral positions. The fifth gear power path includes input shaft 111, pinion 144, fifth gear 156, synchronizer 128, layshaft 118, output pinion 134 and output gear 114.

Sixth gear is produced when clutch 117 is engaged, clutch 115 is disengaged, the selector sleeve of synchronizer 174 is moved rightward into engagement with sixth gear 158, thereby connecting sixth gear 158 to layshaft 118, and the selector sleeves of the other synchronizers are in their neutral positions. The sixth gear power path includes input shaft 112, pinion 140, sixth gear 158, synchronizer 174, layshaft 118, output pinion 134 and output gear 114.

Seventh gear is produced when clutch 115 is engaged, clutch 117 is disengaged, the selector sleeve of synchronizer 124 is moved leftward into engagement with seventh gear 160, thereby connecting seventh gear 160 to layshaft 116, and the selector sleeves of the other synchronizers are in their neutral positions. The seventh gear power path includes input shaft 111, pinion 144, seventh gear 160, synchronizer 124, layshaft 116, output pinion 132 and output gear 114.

Eighth gear is produced when clutch 117 is engaged, clutch 115 is disengaged, the selector sleeve of synchronizer 122 is moved rightward into engagement with eighth gear 176, thereby connecting eighth gear 176 to layshaft 116, and the selector sleeves of the other synchronizers are in their neutral positions. The eighth gear power path includes input shaft 112, pinion 140, eighth gear 176, synchronizer 122, layshaft 116, output pinion 132 and output gear 114.

Reverse gear is produced when clutch 115 is engaged, clutch 117 is disengaged, the selector sleeve of synchronizer 128 is moved rightward into engagement with reverse gear 162, thereby connecting reverse gear 162 and idler 168 to layshaft 118, and the selector sleeves of the other synchronizers are in their neutral positions. The reverse gear power path includes input shaft 111, pinion 146, third gear 152, idler 164, reverse gear 162, synchronizer 128, layshaft 118, output pinion 134 and output gear 114.

Although transmissions 110 and 172 have been described with reference to synchronizers 122, 124, 126, 128, 130 and 174, the synchronizers can be replaced by clutch couplers for connecting a layshaft to a gear selected for engagement to the respective layshaft.

In accordance with the provisions of the patent statutes, the preferred embodiment has been described. However, it should be noted that the alternate embodiments can be practiced otherwise than as specifically illustrated and described.

The invention claimed is:

1. A vehicle transmission, comprising:
    a pinion secured to an input shaft;
    a gear meshing with the pinion;
    an idler secured to the gear;
    a reverse gear meshing with the idler and secured to a second idler;
    a low gear supported on a layshaft and meshing with the second idler;
    a coupler connecting the low gear to the layshaft.

2. The transmission of claim 1, further comprising:
    an output pinion secured to the layshaft and meshing with an output gear.

3. The transmission of claim 1, further comprising:
    a second layshaft supporting the idler and the gear;
    a second coupler for releaseably connecting the idler and the gear to the second layshaft;
    a third layshaft supporting the reverse gear and the second idler;
    a second coupler for releaseably connecting the reverse gear and second idler to the third layshaft.

4. The transmission of claim 1, further comprising:
    a first clutch for producing a drive connection between the input shaft and a power source.

5. The transmission of claim 1, wherein:
    the gear is driven by the pinion at a speed that is less than a speed of the pinion; and
    the reverse gear is driven by the idler at a speed that is less than a speed of the idler; and the low gear is driven by the second idler at a speed that is less than the speed of the second idler.

6. A vehicle transmission, comprising:
an input;
an output;
a pinion secured to the input;
a gear meshing with the pinion and driving the output at a forward speed;
an idler secured to the gear;
a reverse gear meshing with the idler, secured to a second idler and driving the output in reverse;
a low gear engaged with the second idler, and driving the output at a lower forward speed than the gear.

7. The transmission of claim 6, further comprising:
an output pinion secured to the layshaft and meshing with an output gear.

8. The transmission of claim 6, further comprising:
first, second and third layshafts, each layshaft driveably connected to the output;
a first coupler connecting the low gear to the first layshaft;
a second coupler connecting the idler and gear to the second layshaft; and
a third coupler connecting the reverse gear and the second idler to the third layshaft.

9. The transmission of claim 6, wherein the input includes an input shaft, further comprising:
a first layshaft driveably connected to the output;
a second pinion secured to the input shaft;
a second speed gear meshing with the second pinion and supported on the first layshaft;
a third pinion secured to the input shaft;
a sixth speed gear meshing with the third pinion and supported on the first layshaft;
a coupler for alternately connecting the second speed gear and the sixth speed gear to the first layshaft.

10. A vehicle transmission, comprising:
an input including first and second input shafts;
first, second and third layshafts;
a pinion secured to the first input shaft;
a gear meshing with the pinion, secured to an idler and supported on the first layshaft;
a reverse gear meshing with the idler, secured to a second idler and supported on the second layshaft;
a low gear supported on the third layshaft and meshing with the second idler;
a second pinion secured to the second input shaft;
a second speed gear meshing with the second pinion and supported on the first layshaft
a first coupler connecting the low gear to the third layshaft;
a second coupler connecting the idler and gear to the second layshaft; and
a third coupler connecting the reverse gear and the second idler to the second layshaft; and
a fourth coupler connecting the second speed gear and the second idler to the first layshaft.

11. The transmission of claim 10, further comprising:
a third pinion secured to the first input shaft;
a fifth speed gear meshing with the second pinion and supported on the third layshaft;
a seventh speed gear meshing with the third pinion and supported on the first layshaft;
the third coupler alternately connecting the fifth speed gear and the reverse gear to the second layshaft;
the second coupler alternately connecting the seventh speed gear and the idler to the first layshaft.

* * * * *